United States Patent [19]  [11] Patent Number: 5,075,362
Hofeldt et al.  [45] Date of Patent: Dec. 24, 1991

[54] SEALED CONTAINERS AND SEALING COMPOSITIONS FOR THEM

[75] Inventors: Robert M. Hofeldt, Littleton, Mass.; Steven A. C. White, Ivinghoe, England

[73] Assignee: W. R. Grace & Co.-Conn., New York, N.Y.

[21] Appl. No.: 694,158

[22] Filed: May 1, 1991

Related U.S. Application Data

[63] Continuation of Ser. No. 307,670, Feb. 7, 1989, abandoned.

[30] Foreign Application Priority Data

Feb. 10, 1988 [GB] United Kingdom ............... 8803062

[51] Int. Cl.$^5$ ............................................... C08K 5/13
[52] U.S. Cl. ............................................. 524/72; 524/76; 524/111; 524/112; 428/158; 428/159
[58] Field of Search ............... 524/111, 112, 72, 76; 428/158, 159

[56] References Cited

U.S. PATENT DOCUMENTS

| 3,586,514 | 6/1971 | Vijibrief | 99/171 |
| 4,188,457 | 2/1980 | Throp | 428/158 |
| 4,279,350 | 7/1981 | King | 215/228 |
| 4,536,409 | 8/1985 | Farrell et al. | 426/398 |
| 4,702,966 | 10/1987 | Farrell et al. | 428/500 |

FOREIGN PATENT DOCUMENTS

| 0083826 | 1/1982 | European Pat. Off. |
| 0129309 | 4/1984 | European Pat. Off. |
| 0182674 | 11/1985 | European Pat. Off. |
| 0129309 | 3/1988 | European Pat. Off. |
| 2349508 | 4/1977 | France |
| 1112025 | 5/1968 | United Kingdom |
| 2084600 | 9/1984 | United Kingdom |
| 2197634 | 5/1988 | United Kingdom |

Primary Examiner—Kriellion S. Morgan
Attorney, Agent, or Firm—John Dana Hubbard; William L. Baker

[57] ABSTRACT

A sealing composition for a container closure comprises a polymeric matrix material and is modified by the inclusion therein of an oxygen scavenger. The composition can be in fluid or meltable form ready for application to a closure or it can be present as a deposit on the closure, for instance a gasket around the closure. Preferably the scavenging properties of the deposit are activated by pasteurizing or sterilizing the deposit when sealing a container with the closure. The invention is of particular value when the closure is a metal cap for a beer bottle.

16 Claims, No Drawings

SEALED CONTAINERS AND SEALING COMPOSITIONS FOR THEM

This is a continuation of application Ser. No. 07/307,670, filed Feb. 7, 1989 now abandoned.

This invention relates to polymeric compositions that can be used to improve the shelf life of packaged materials, such as bottled beer.

It is standard practice to package food and other materials within laminated polymeric sheet material that generally often includes a barrier layer of low permeability to oxygen. The sheet material can be thin, in which event it is wrapped around the material being packaged, or it can be sufficiently thick that it forms a container body that is provided with a lid or other separate closure. The polymeric sheet material thus consitutes most or all of the exposed surface area of the container.

It is known to include an oxygen scavenger in the sheet material. The oxygen scavenger reacts with oxygen that is trapped in the package or that permeates through the laminate. This is described in, for instance, U.S. Pat. Nos. 4,536,409 and 4,702,966 and the prior art discussed in those. For instance, U.S. Pat. No. 4,536,409 describes cylindrical containers formed from such sheet material and provided with metal lids.

When the container is formed of a glass or metal body and is provided with a metal closure then permeation of oxygen through the body and the closure is impossible because of the impermeability of the materials from which the body and closure are formed. However it has long been recognised that when conventional containers of this type are used for the storage of materials such as beer, the shelf life of the stored materials is very limited. The quality of the beer tends to deteriorate after storage for a month or so. The only effective way of prolonging the storage life has been to provide a gasket of cork and aluminium foil between the closure and the container body but this is wholly uneconomic. Accordingly at present it is accepted that the shelf life of beer, especially in bottles, is rather limited.

It would be very desirable to be able to improve the shelf life significantly whilst continuing to use conventional materials for the formation of the container body, the container closure and the gasket between the body and closure.

Although traditional closures are designed to be removed in their entirety, there are an increasing number of can ends or other closures that include push components or pull components which are intended to be, respectively, pushed or pulled in order to allow removal of the beverage in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

A fluid or meltable composition according to the invention is suitable for being applied on to, and solidified on, a container closure and comprises a polymeric matrix material and an oxygen scavenger.

The invention includes container closures carrying a solid deposit formed on the closure from such a composition and that is positioned to seal around, or over a line of weakness in, the closure. The solid deposit can be a gasket deposited around the closure and formed from the composition. Instead of, or in addition to the deposit being such a gasket, the deposit can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus the area of the solid deposit can be very small relative to the area of the container. Despite this, the invention can give greatly improved storage stability.

The invention also includes filled containers sealed with such closures. The sealed container comprises a container body, the closure fitted on it, and the filling that is contained within the container body. The container body is preferably of glass or metal. The closure is preferably of metal.

The filling can be any beverage, foodstuff or other material that is to be stored within the container but the invention is of particular value when the filling is a material whose shelf-life is normally restricted due to contamination, during storage, by oxygen. In particular, the invention is of value when the filling is beer.

The container body can be a can, generally of metal, in which event the closure is a can end. Generally the entire closure is of metal but the panel of the closure can include a removable (generally pull) component of polymeric material.

Instead of a can body, the container body can be a bottle or jar in which event the closure is a cap. The bottle or jar is preferably of glass but it can be of oxygen-impermeable polymeric material, for instance polymeric material that includes a barrier layer of impermeable polymer. The cap can be of polymeric material that is preferably relatively impermeable, for instance of polypropylene that may include a barrier layer. Generally it is of metal, although it may include a push or pull component of polymeric material. The cap may be a crown cap, a twist-on cap or a screw-on cap or any other conventional form of metal cap or polymeric cap suitable for closing the bottle or jar.

A gasket is normally provided between the container and the closure and this gasket is preferably formed from the composition of the invention but it is possible for the composition of the invention to be utilised elsewhere on the closure in which event the gasket-forming composition can be any conventional composition suitable for forming the gasket.

When the closure is a cap, the gasket may be an overall gasket. However generally, for both caps and can ends, the gasket is an annular gasket and may be deposited in conventional manner from the gasket-forming composition. For instance an annular gasket can be formed on a can end by being applied in liquid form as an annulus around the can end and can then be converted to solid form by drying and/or heating. The gasket-forming composition may, for this purpose, be a dispersion, latex, plastisol, or organic solution. The can end, carrying the annular gasket, is the pressed on to an appropriate sealing face around the open end of the filled container and folded around this face in conventional manner.

When the closure is a cap for a bottle or jar, the gasket-forming composition can be any of these or a plastisol, and can be applied in similar manner, but preferably the composition is a thermoplastic composition.

It may be applied as a low viscosity melt while the cap is spinning, so as to throw the composition into the form of an annulus, or it may be applied as a melt which is then moulded into the desired shape, often a disc having a thickened annular portion.

It is particularly preferred, in the invention, that the gasket on the container closure should be formed by applying the fluid or molten composition of the invention and solidifying it on the closure, the method of application and solidification generally being conventional. It is particularly preferred that the container and can end should both be of metal or the container should be of glass and the cap of metal, since the use of the defined compositions for forming the gasket then appears to give particularly beneficial results. In particular, excellent results are achievable when the container is a glass bottle and the closure is a metal cap, especially when the filling in the container is beer.

Instead of or in addition to using the fluid or meltable composition of the invention for forming the gasket, it is possible to deposit the composition elsewhere on the inner face of the closure. It may be applied as an overall coating of the inner face of the panel of the closure or it may be applied over part only of the inner face. In particular, when the panel includes one or more push or pull components defined in the panel by discontinuities or lines of weakness the composition may have been applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. The fluid composition may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the invention can both prevent corrosion and improve storage of fillings such as beer.

The composition of the invention may be formulated in any convenient fluid form, such as a melt, plastisol, organic solution, latex or dispersion. The main ingredients of the composition, apart from the oxygen scavenger, are normally typical of those conventionally present for the intended purpose.

The composition comprises a polymeric matrix material, that is to say polymeric material that will form the matrix of the solidified deposit. The polymeric matrix material will be selected having regard to the nature of the composition (dispersion, latex, plastisol, solution or melt) in conventional manner.

Suitable materials for use as the polymeric component of latex compositions, e.g., for can ends, are described in GB 2,084,600 and EP 0182674. Suitable polymeric materials for use when the compositions are organic solutions or aqueous dispersions are described in GB 2,084,601. Suitable materials for use when the compositions are plastisols include vinyl chloride homopolymers and copolymers. Instead of preparing such compositions as true plastisols, they may be provided as dry blends of the polymer and plasticiser. Suitable materials for use in thermoplastic compositions include the materials proposed in GB 1,112,025 or EP 129309, 129310 or 153042.

In particular, the polymeric material is generally selected from polyethylene, polypropylene, ethylene propylene copolymers, butyl rubber, styrene butadiene rubber, carboxylated styrene butadiene, polyisoprene, styrene isoprene styrene block copolymers, styrene butadiene styrene block copolymers, styrene ethylene butylene styrene block copolymers, ethylene vinyl acetate copolymers, ethylene (meth) acrylate copolymers (for instance ethylene butyl acrylate copolymers), ethylene vinyl alcohol copolymers, vinyl chloride homopolymers and copolymers, styrene acrylic polymers, polyamides, and vinyl acetate polymers, and blends of one or more of these.

Particularly preferred compositions according to the invention are thermoplastic compositions formed of ethylene vinyl acetate or polyethylene or blends thereof. The polyethylene, if used, is preferably a low density polyethylene, and may be a very low density polyethylene. The ethylene vinyl acetate copolymer, if used, preferably has a melt index in the range 3 to 15, preferably 5 to 10, and generally contains 5 to 28%, preferably 5 to 20%, vinyl acetate.

The compositions may contain filler, slip aids, process aids, pigments, stabilisers, anti-oxidants, tackifying resins and other conventional additives in conventional amounts, depending upon the nature of the composition. If the composition is a thermoplastic composition the total amount of such additives is generally below 10%, most preferably below 3%, based on the total weight of the composition but when the composition is a plastisol, dispersion, organic solution or dispersion the amounts of additives, based on polymeric material may be higher. For instance a large amount of filler may be incorporated.

The essential feature of the invention is that the fluid or meltable composition contains an oxygen scavenger, that is to say a reducing agent that can react with gaseous oxygen. The composition may also contain small amounts of anti-oxidant in known manner to stabilise the polymeric composition against degradation due to free radicals caused by reaction between oxygen and the polymer. The scavengers used in the invention however react with gaseous oxygen.

The oxygen scavenger is preferably a reducing agent that reacts with gaseous oxygen in an ionic reaction that requires the presence of moisture. If such a material is used, the composition should be non-aqueous (i.e., an anhydrous solution, plastisol or melt) so as to prevent initiation of the reaction within the composition. Alternatively the scavenger should be encapsulated or in some other way prevented from reacting with water in the composition.

Although the literature, such as U.S. Pat. No. 4,536,409, recommends potassium sulphite as a scavenger we find that it is particularly desirable to use ascorbates or isoascorbates or mixtures thereof with each other or with a sulphite, often sodium sulphite. In general the alkali metal (usually potassium or sodium) salts of sulphites, ascorbates and isoascorbates are preferred. Organic reducing agents such as tannins can be used. Mixtures of sulphites and ascorbates, as alkali metal salts are particularly preferred.

A preferred aspect of the invention is that the scavenger should remain substantially inert in the composition and in the gasket or other solid deposit until the deposit is on a sealed container. As mentioned, the composition is therefore preferably anhydrous and the polymeric matrix of the deposit is also preferably anhydrous. Generally the polymeric matrix substantially protects the scavenger from moisture under normal atmospheric conditions.

Exposure of the matrix to the high humidity that normally exists within a sealed container may therefore result in sufficient permeation of moisture into the deposit to give a satisfactory degree of scavenging and improved shelf life. However the scavenging reaction can be accelerated by heating the deposit to cause increased permeation of moisture. Thus preferably the scavenger is a material that remains substantially inert in the polymeric matrix until the scavenging reaction is accelerated by heating in the presence of moisture.

Preferably the scavenging reaction is accelerated by pasteurising (typically at 50°-100° C.) or sterilising (typically at 100°-150° C.) the container after filling it with an aqueous fill and sealing it, using the gasket of the invention. This triggering appears to be a consequence of the gasket, when heated, permitting moisture to permeate into the gasket and to become trapped in the gasket thereby bringing the scavenger into contact with sufficient water to permit reaction with oxygen. This oxygen may permeate through the gasket either from oxygen trapped within the container when it was filled or from the surrounding atmosphere.

It may be desirable to include in that composition a material, for instance a surfactant such as sodium dodecylbenzene sulphonate, which will increase the permeability of the composition to water and a suitable amount of a surfactant such as this is between 0.1 and 1.0% by weight.

The amount of the scavenger is normally at least 0.5% based on the polymeric matrix material, generally at least 1% and preferably at least 2%. It is generally unnecessary for the amount to be above 10% and 4% or 5% is often a convenient maximum. Expressed in an alternative manner, the amount of scavenger is typically in the range 0.01 to 2 g, often 0.02 to 0.1 g, per gasket.

By the invention it is possible to greatly prolong the shelf life of the beer or other content of the sealed container so that the degree of oxygen contamination after, say, six months is still less than the degree conventionally achieved, in the absence of the scavenger, in less than two months. In particular, by the invention it is easily possible to ensure that there is substantially no oxygen contamination of the beer for at least four months after pasteurisation.

The following are some examples.

EXAMPLE 1

A suitable thermoplastic composition that can be used for moulding gaskets is formed of 100 parts by weight low density polyethylene, 2 pbw sodium ascorbate, 1 pbw lubricant and 0.2 pbw anti-oxidant.

EXAMPLE 2

Another suitable composition for the same purpose is formed of 100 parts ethylene vinyl acetate with 14% vinyl acetate content, 5 pbw sodium sulphite, 2 pbw sodium ascorbate, 1 pbw lubricant and 0.2 pbw anti-oxidant.

EXAMPLE 3

A suitable plastisol composition is formed of

| | |
|---|---|
| PVC paste grade resin | 130 parts |
| PVC filler resin | 70 parts |
| di-octyl phthalate | 120 parts |
| lubricant | 4 parts |
| sodium ascorbate | 4 parts |
| sodium sulphite | 10 parts |

EXAMPLE 4

A suitable dry blend plasticised PVC composition is formed of 100 parts suspension grade PVC, 66 parts dioctyl phthalate, 5 parts epoxidised soya bean oil and 0.01 parts fumed silica and 4 parts sodium ascorbate.

EXAMPLE 5

Thermoplastic gasket compositions are prepared from low density polyethylene broadly as in example 1, with and without the addition of 2% sodium ascorbate. Molten composition is deposited in a crown closure and cold moulded in conventional manner and then closed on to glass bottles containing water. After pasteurisation at 60° C. for 20 minutes the bottles are stored for two months. At the end of this period the oxygen content of the water in the bottles is measured. In the case of those bottles closed with the gaskets without added scavenger the average oxygen content per bottle is 96 microgram. In the case of the bottles closed with the gaskets containing the scavenger the amount of oxygen is zero.

EXAMPLE 6

A polyethylene based gasket was prepared containing 2% sodium ascorbate and 5% sodium sulphite and moulded in the form of gaskets. Four of these gaskets totalling 1 g in weight without further treatment were sealed in a flask containing 250 ml of water. Four other gaskets were subjected to a simulated pasteurisation cycle by immersing in water at 60° C. for 20 minutes before being sealed into a flask containing 250 ml water. After three days storage the oxygen content of the water was measured. In the case of the untreated gaskets the oxygen content has decreased by only 30% of its original value whereas in the case of the gaskets subjected to pasteurisation the oxygen content had reduced by 70%.

EXAMPLE 7

The composition of example 2 is lined, by moulding a melt, as a gasket into crown closures for beer bottles. The bottles are filled with beer, the crown closures are fitted, and the filled bottles are then pasteurised in conventional manner. After storage for four months, there is no evidence of contamination of the beer by oxygen. In comparison, when the same composition is used without the scavenger mixture, there is evidence of contamination by oxygen after storage for one month.

EXAMPLE 8

A metal can lid is constructed with two push components, broadly as described in DE 3,639,426. A plastisol is formed of the preferred composition listed in column 7 of DE 3,639,426 except that 5 parts sodium sulphite and 3 parts sodium ascorbate, per 100 parts composition, are additionally included in the plastisol. The plastisol is lined around the cut lines of the two push components. The same or similar plastisol, also containing sodium ascorbate and sodium sulphite, is additionally lined around the outer annulus of the can lid. After curing, the can lid has a gasket around its outer annulus and two rings of solidified plastisol providing a seal between the edges of the push component and the can lid and additionally protecting the cut edges of both.

The resultant can lid can then be used to seal a carbonated beverage or beer can in conventional manner.

EXAMPLE 9

A jar is sealed with a 63 mm polypropylene cap provided with a gasket weighing 1.2 g and formed from a pvc plastisol containing 5%, based on polymer, sodium ascorbate.

EXAMPLE 10

A beer bottle is sealed with a 28 mm polypropylene cap provided with a 0.5 g gasket formed by moulding a composition of 100 parts low density polyethylene, 1 part lubricant, 0.2 parts antioxidant, 5 parts sodium sulphite and 2 parts sodium ascorbate.

While this present invention has been described in regard to its preferred embodiments, other embodiments can achieve the same result. Variations and modifications of the present invention will be obvious to those skilled in the art and it is intended to cover in appended claims all such modifications and equivalents as fall within the true spirit and scope of this invention.

What is claimed:

1. A closure gasket composition comprising a polymeric matrix material in a liquid or molten form and an oxygen scavenger consisting of an ascorbate.

2. The closure gasket composition of claim 1 wherein the polymeric matrix material is in the form of a dispersion, latex, hot melt, plastisol or organic solution.

3. The closure gasket composition of claim 1 wherein the oxygen scavenger is present in an amount of from about 0.5 to 10 parts by weight per 100 parts by weight of polymeric matrix material and the oxygen scavenger is sodium ascorbate.

4. The closure gasket composition of claim 1 wherein the oxygen scavenger is an alkali metal salt of an ascorbate.

5. A gasket composition comprising a thermoplastic resin and an oxygen scavenger of an ascorbate.

6. The gasket composition of claim 5 wherein the thermoplastic resin is selected from the group consisting of low density polyethylene, ethylene vinyl acetate copolymers and blends thereof.

7. The gasket composition of claim 5 wherein the oxygen scavenger is sodium ascorbate.

8. The gasket composition of claim 5 wherein the oxygen scavenger is selected from the group consisting of alkali metal ascorbates.

9. The gasket composition of claim 5 wherein the amount of oxygen scavenger is from about 0.5 to about 10 parts by weight per 100 parts by weight of thermoplastic resin.

10. A thermoplastic gasket composition comprising a thermoplastic blend of polyethylene and ethylene vinyl acetate copolymer and an oxygen scavenger formed of an ascorbate present in an amount of from about 0.5 to 10 parts by weight per 100 parts by weight of the thermoplastic blend.

11. The gasket composition of claim 10 wherein the ascorbate is sodium ascorbate.

12. The gasket composition of claim 10 wherein the polyethylene is low density polyethylene.

13. The gasket composition of claim 10 wherein the ethylene vinyl acetate copolymer has a melt index of from about 3 to about 15 and vinyl acetate content of from about 5 to about 28%.

14. A gasket composition comprising polyethylene and an ascorbate oxygen scavenger.

15. The gasket composition of claim 14 wherein the polyethylene is selected from the group consisting of low density polyethylene and very low density polyethylene, the ascorbate oxygen scavenger is present in an amount of from about 0.5 to about 10 parts per 100 parts of polyethylene.

16. The gasket composition of claim 14 wherein the oxygen scavenger is sodium ascorbate.

* * * * *